United States Patent [19]
Engibarov

[11] Patent Number: 5,551,795
[45] Date of Patent: Sep. 3, 1996

[54] TOOL HOLDER SUPPORT ASSEMBLY

[76] Inventor: Eddy Engibarov, c/o E.Z.E. Machine Company, 616 Onderdonk Ave., Ridgewood, N.Y. 11385

[21] Appl. No.: 300,796

[22] Filed: Sep. 2, 1994

[51] Int. Cl.⁶ ............................................. F16B 2/14
[52] U.S. Cl. .......................... 403/381; 403/374; 403/320; 269/73; 82/158
[58] Field of Search ..................... 403/381, 338, 403/336, 335, 324, 323, 322, 373, 374, 375, 376, 380, 321, 320, 315, 355, 408.1, 409.1, 294; 82/158, 160, 161; 409/235, 227; 269/73; 248/223.4, 224.2, 225.1, 231.4, 316.4

[56] References Cited

U.S. PATENT DOCUMENTS

| | | | |
|---|---|---|---|
| 979,903 | 12/1910 | Van Norman | 82/161 |
| 4,057,294 | 11/1977 | Krekeler | 82/158 X |
| 4,090,796 | 5/1978 | Okuda et al. | 403/381 X |
| 4,164,880 | 8/1979 | DiMarco | 82/158 |
| 4,300,271 | 11/1981 | Wohlhaupter | 403/373 X |
| 4,418,593 | 12/1983 | Frydel | 82/158 |
| 4,520,701 | 6/1985 | Watamura | 82/161 X |
| 4,677,726 | 7/1987 | Williams | 409/235 X |
| 4,730,373 | 3/1988 | Senoh | 409/227 X |
| 4,759,244 | 7/1988 | Engibarov | 82/158 X |
| 4,911,574 | 3/1990 | Vander Pol et al. | 82/158 X |
| 5,056,766 | 10/1991 | Engibarov | |
| 5,060,920 | 10/1991 | Engibarov | |

FOREIGN PATENT DOCUMENTS

| | | | |
|---|---|---|---|
| 966336 | 4/1975 | Canada | 82/158 |
| 431209 | 6/1991 | European Pat. Off. | 403/373 |
| 1328637 | 8/1973 | United Kingdom | 403/381 |

*Primary Examiner*—Kenneth J. Dorner
*Assistant Examiner*—Harry C. Kim
*Attorney, Agent, or Firm*—Helfgott & Karas, P.C.

[57] ABSTRACT

In a tool holder support assembly, a horizontal slide member connects to a machinery table with a T-slot connection, and a vertical support post connects to the slide member with a sliding dovetail joint. The slide member and post are fixed together by a wedge that extends from the post and presses transversely against a sloped surface of a dovetail protrusion on the sliding member, when a bolt is rotated. The slide member is fixed to the machining table by engaging a nut located in the T-slot with a bolt passed through the slide member. Alignment is provided between the machining table and slide member by abutting external surfaces.

9 Claims, 4 Drawing Sheets

TOOL HOLDER SUPPORT ASSEMBLY

BACKGROUND OF THE INVENTION

In high precision computer controlled machining techniques, it is common to have a plurality of tools individually and simultaneously mounted to a machining table having an elongated T-slot in its upper surface. Tools, individually and in clusters, are supported on an intermediate tool holder which in turn must be connected, using the T-slot with both speed and precision at a desired position on the machining table. In positioning a tool held by its tool holder on a machining table, it is desired that cumbersome procedures be avoided, especially, when tools must be replaced due to wear, repositioned or removed from the machining table.

Thus, the ability to readily move tools, with as many degrees of freedom as possible, is desirable, with the T-slot in the machining table giving one such degree of freedom. Other intermediate elements between the tool and the machining table provide additional degrees of freedom such that precision location of the tool on its tool holder in X, Y, Z coordinates is possible.

This precision in locating a tool, in some instances, depends upon the cumulative precision of many surfaces that must interengage before all of the elements are held in position, generally by means of a bolt.

In the prior art, it is common that an inverted T-shape element connected to the tool holder precisely engages the T-shape slot of the machining table before being fixed in place with a bolt, screw locking mechanism, etc. Similarly, a dovetail on one element may be required to register precisely with a sliding fit in a dovetail slot. The mating T elements and dovetail elements require high precision when they are produced.

What is needed is a support assembly for a tool holder utilizing T and dovetail elements, that is quickly and precisely positioned on a machining table and is more easily produced than prior art devices.

SUMMARY OF THE INVENTION

It is an object of the invention to provide an improved tool holder support assembly, which allows adjustment with three degrees of freedom.

It is a further object of the invention to provide an improved tool holder support assembly that accurately sets a tool holder support post in a desired position on a slide using a dovetail joint without precision engagement.

Still another object of the invention is to provide an improved tool holder support assembly that readily aligns on a machining table having a T-slot, without precision engagement with the T-slot.

A tool holder support assembly includes a machining table having a longitudinal T-slot. The support assembly also includes a horizontal slide member that rests on an upper surface of the machining table and is slidingly positionable along the length of the machining platform, being guided by the T-slot.

A tool holder support member, that is, a vertical post rests slidingly on an upper surface of the horizontal slide member, and is connected with the slide member by a dovetail joint. The dovetail joint is at a right angle relative to the T-slot, and the vertical post slides along the length of the dovetail joint.

A locking mechanism includes a bolt and a wedge member that fits into a cylindrical bore formed in the vertical post. A dovetail slot in the vertical post, extends at a right angle to and intercepts the cylindrical bore, producing an opening that connects the bore with the dovetail slot.

The wedge member has an angled surface with a tilt corresponding to the side angles of the dovetail projection on the slide member. An unthreaded counter sunk bore in an opposite face of the vertical post allows connection between the bolt and the wedge member through the body of the vertical post.

When assembled, the wedge member is inserted into the cylindrical bore of the vertical post, which is slidably engaged with the slide member by means of the dovetail joint. A slanted surface of the dovetail on the slide member overhangs a portion of the angled surface on the wedge member.

When the bolt is rotated, the wedge member moves until the angled surface of the wedge member presses against the angled surface of the protruding dovetail on the horizontal slide member. The wedge member and body of the vertical post move by wedging action against the upper surface of the horizontal slide member until the slide member and the vertical post are fixed relative to each other.

The invention accordingly comprises the features of construction, combination of elements, an arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 6:
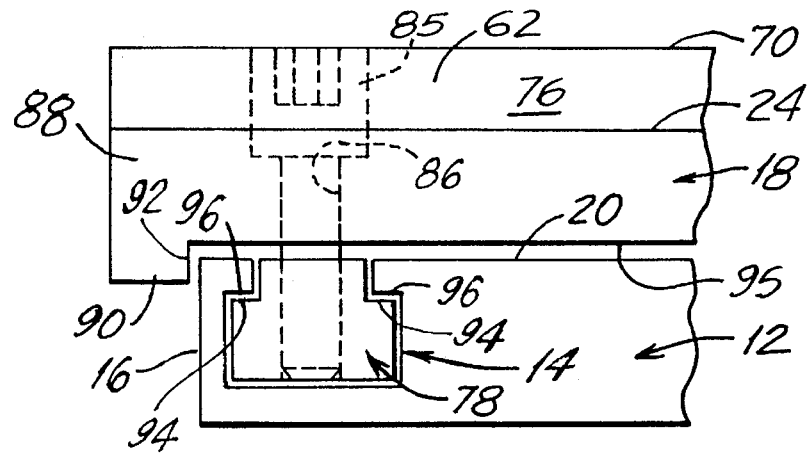
FIG. 6 is an elevation of the T-joint in the support assembly of FIG. 1.
Figure 7:
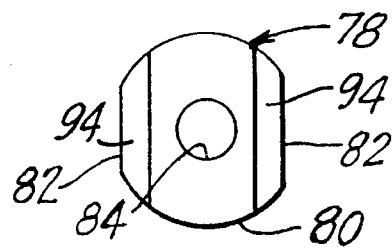
FIG. 7 is a top view of a nut element of FIG. 6.

With reference to FIGS. 1–7, the tool holder support assembly 10 in accordance with the invention includes a bed, platform or machining table 12 having a longitudinal T-shaped slot 14 near a vertical front end surface 16. The support assembly 10 also includes a horizontal slotting or slide member 18 that rests on an upper surface 20 of the machining table 12. As illustrated in FIGS. 6, 7, the slide member 18 is slidingly positionable along the length of the machining platform 12, being guided by the T-shape slot 14, as described hereinafter.

A tool holder support member, that is, a vertical post 22 rests slidingly on an upper surface 24 of the horizontal slide member 18, and is interengaged with the slide member 18 by a dovetail joint 26. The dovetail joint is at a right angle relative to the T-shape slot 14, and the vertical post 22 slides along the length of the dovetail joint 26.

A dovetail projection 28 extends vertically along the body 30 of the vertical post 22 and is used for attachment of a tool holder (not shown). The present invention does not include a tool holder and an attachment to the post 22 as novel features. Accordingly, a tool holder has not been illustrated or described in detail herein.

A locking mechanism 32 for engaging the vertical post 22 with the horizontal slide member 18 includes a wedge member 34 and a bolt 36. The wedge member 34 is a cylinder from which portions have been removed. A cylindrical outer surface 38 fits into a cylindrical bore 40 formed in the face 42 of the vertical post 22.

A dovetail slot 44, formed in the lower surface 46 of the vertical post 22, extends at a right angle to the longitudinal axis 48 of the cylindrical bore 40 and has a height 50 such that the dovetail slot 44 intercepts the cylindrical bore 40, producing an opening that connects the bore 40 with the dovetail slot 44 in the vertical post 22.

A portion of the wedge member 34 has been removed to produce a flat chordal surface 52 and a angled surface 54 that meets the outer cylindrical surface 38 in an arcuate edge 56. The angle 58 between the flat chordal surface 52 and the angled surface 54 corresponds to the angle 60 (FIG. 1) of the dovetail projection 62 on the slide member 18. The chordal surface 52 is offset from a central threaded opening 64 in the wedge member 34, and the bolt 36 is threaded to engage the opening 64. An unthreaded counter-sunk bore 66 in the opposite face 68 of the vertical post 22 allows connection between the bolt 36 and the wedge member 34 through the body 30 of the vertical post 22.

Figure 1:
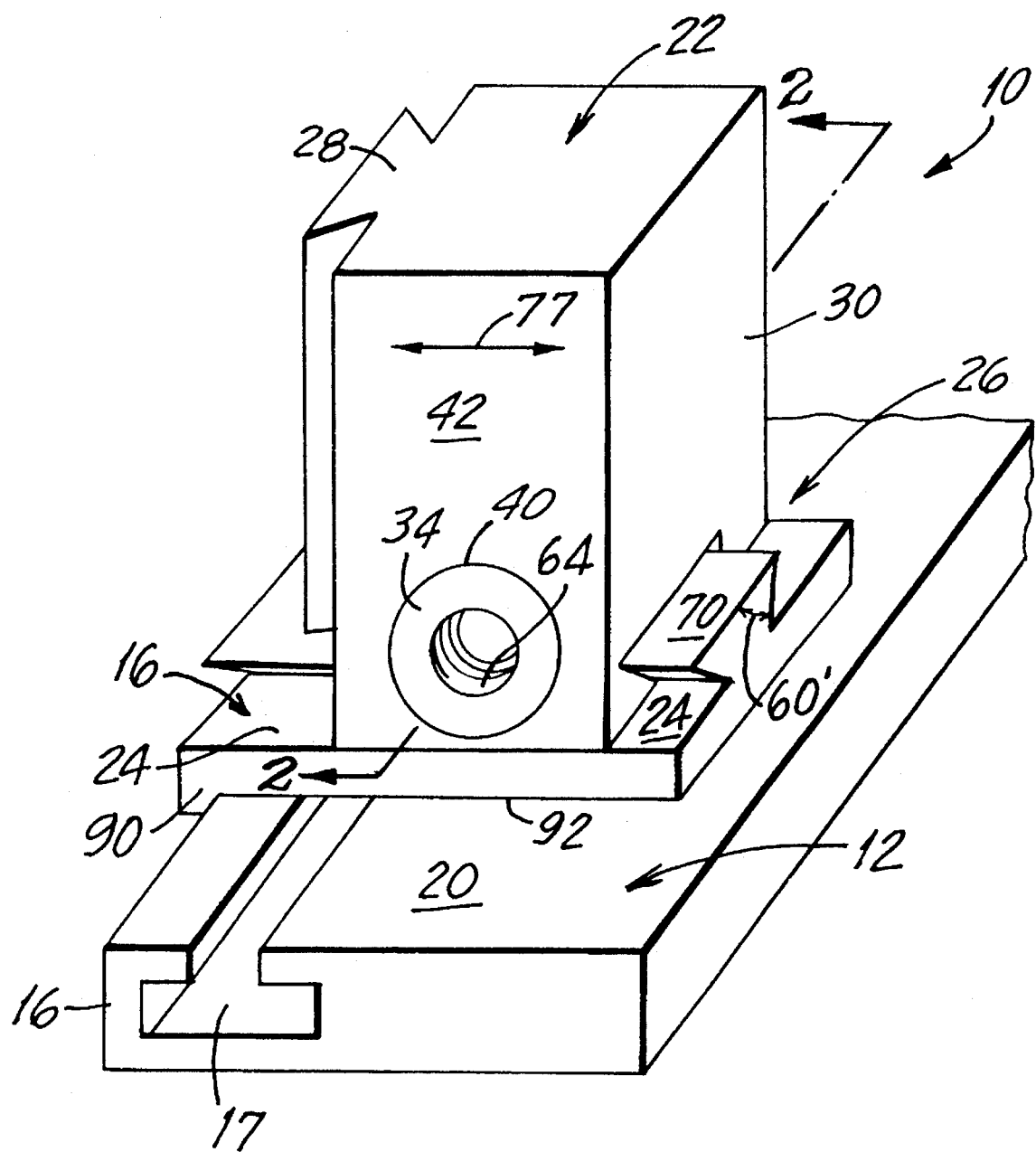
FIG. 1 is a top perspective view of a tool holder support assembly in accordance with the invention.
Figure 2:
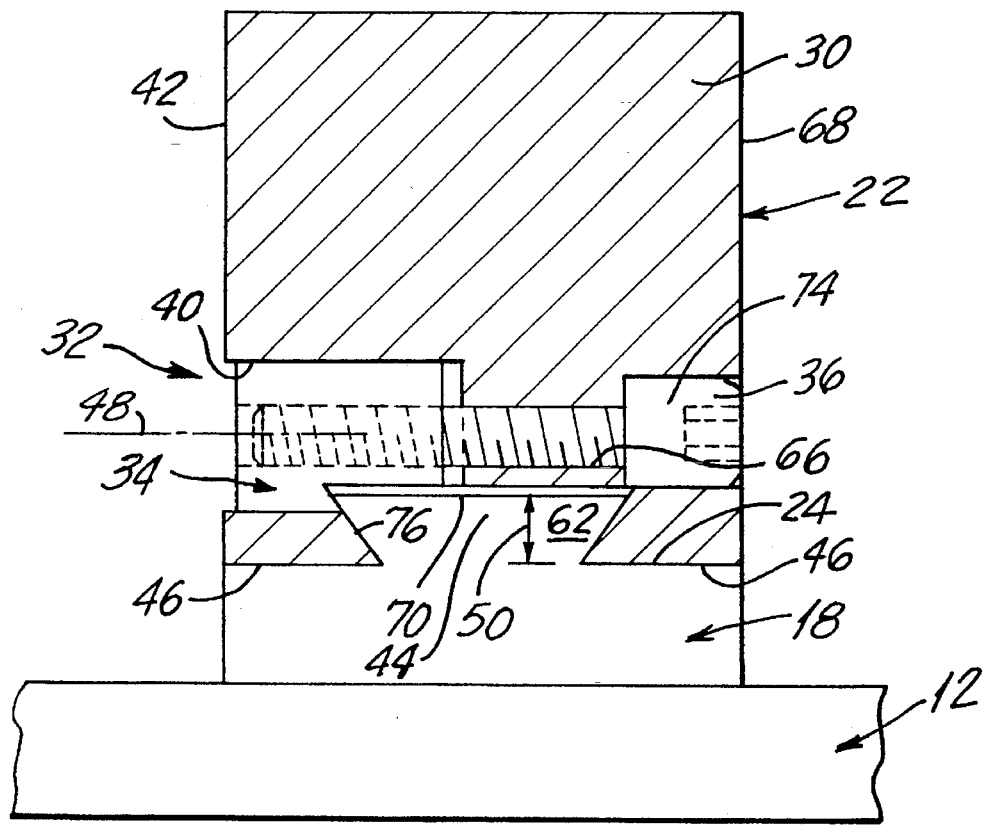
FIG. 2 is a side view of the support assembly of FIG. 1, partly in section along the line 2—2 of FIG. 1.
Figure 3:
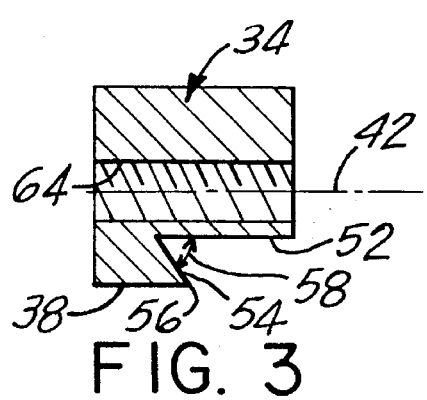
FIG. 3 is a section of a wedge element taken along the line 3—3 of FIG. 4.
Figure 4:
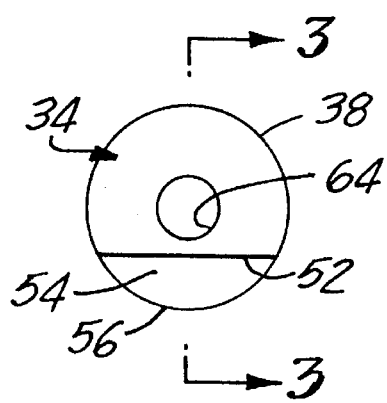
FIG. 4 is an end view of the wedge element of FIG. 3.
Figure 5:
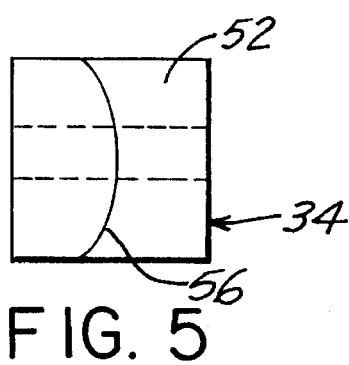
FIG. 5 is a bottom view of the wedge element of FIG. 3.

When assembled, as illustrated in FIG. 2, the wedge member 34 is inserted into the cylindrical bore 40 of the vertical post 22, which is, to this point in assembly, slidably engaged with the slide member 18 by means of the dovetail joint 26. The chordal surface 52 is spaced from the upper surface 70 of the protruding dovetail 62 on the slide member 18, and the left slanted surface (FIG. 2) of the dovetail 62 on the slide member 18 overhangs a portion of the angled surface 54 on the wedge member 34. A loose sliding fit is provided without contact between the vertical post 22 and the horizontal slide member 18 except where the lower surface 46 of the vertical post 22 rests slidably on the upper surface 24 of the slide member 18, that is, on planar strips lying parallel to the length of the dovetail joint 26.

When the bolt 36 is rotated clockwise, an hexagonal Allen-head socket 72 being provided in the head 74 of the bolt 36, the wedge member 34 is drawn to the right (FIG. 2) until the angled surface 54 of the wedge member 34 slides against the angled surface 76 of the protruding dovetail 62 on the horizontal slide member 18. As the bolt 36 is rotated and the wedge member 34 continues to move to the right, the wedge member 34 and the entire body 30 of the vertical post 22 move downward by wedging action to press harder against the upper surface 24 of the horizontal slide member 18 until the slide member 18 and the vertical post 22 are locked in place relative to each other.

At any time that it is desired to change the position of the vertical post 22 on the slide member 18, it is only necessary that the bolt 36 be backed off so that the wedge member 34 releases its grip on the angled surface 76 of the protruding dovetail portion 62 of the member 18. Then, the vertical post 22 may be slid in either direction as indicated by the double-ended arrow 77, and the bolt 36 can be retightened to fix the post 22.

The wedging action of the angled surface 54 against the dovetail surface 76 creates a high holding force that holds the post 22 to the desired position on the dovetail without reliance on a close fit of the two dovetail shapes. In the locked position, there can be a gap between the upper surface 70 of the dovetail and the body 30 and between the planar surface 52 of the wedge member 34 and the vertical post 22. Thus, precision finish on the surface 70 and the opposing surface is not necessary. Only contacts at the surfaces 54, 76 and 24, 46 are needed to fix the post 22 on the slide member 18.

With reference to FIGS. 6 and 7, a T-shape nut or anchor 78 has a generally circular periphery 80 that has been flattened with opposing flats 82 that allow the T-shape nut 78 to slide into the T-shaped slot 14 in the machining table 12 with a singular orientation. The full diameter at the rounded portions 80 of the nut 78 would not enter into the T-shaped slot 14.

A central threaded hole 84 passes through the nut 78. A bolt 85 seats in a counter-sunk unthreaded bore 86 through the upper surface 70 of the dovetail projection 62 on the horizontal slide member 18, and engages the threaded hole 84 in the T-shaped nut 78.

At the end 88 of the horizontal slide member 18, a right angle overhang 90 includes a vertical surface 92 for abutment with the front end surface 16 of the machining table 12.

When the bolt 85, having an Allen-head socket 93, is tightened, the nut 78 is drawn toward the slide member 18 until the upper surface 20 of the machining table 12 abuts the under surface 95 of the horizontal slide member 18. The flat surfaces 82 prevent nut rotation. In this condition, only the horizontal surfaces 94 of the nut 78 and the horizontal surfaces 96 in the T-shaped slot 14 are in engagement. Otherwise, there may be clearance between the nut 78 and the T-shaped slot 14. Thus, the requirements for precision machine surfaces on the nut and in the T-shaped slot are reduced.

In order to assure accurate perpendicularity between the dovetail joint 26 and the T-shaped slot 14, the overhanging surface 92 is placed into continuous abutment with the front end surface 16 of the machining table 12, before the bolt 85 is tightened. Again, precision alignment is achieved with a reduced number of precision machined mating surfaces in the T-shaped slot and nut.

Figure 8:
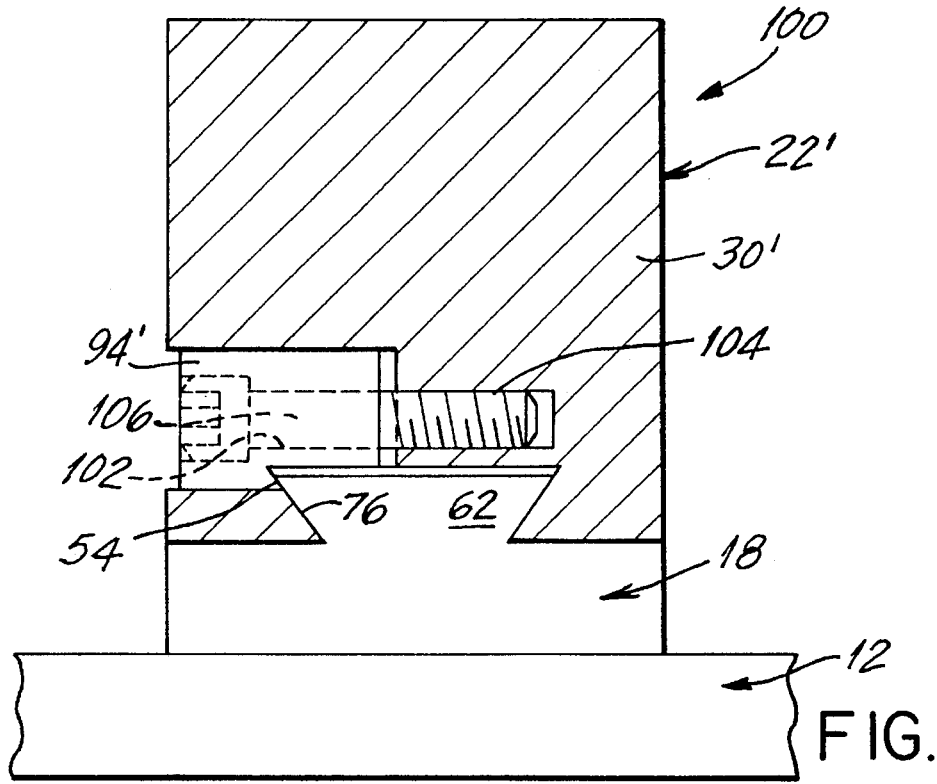
FIG. 8 is an alternative embodiment of a support assembly in accordance with the invention.

FIG. 8 illustrates an alternative embodiment 100 of a support assembly in accordance with the invention. Similar parts in all embodiments are given the same reference numeral. The machining table 12 and slide member 18 are identical in features with the embodiment of FIGS. 1–7. However, a wedge member 34' is provided with an unthreaded counter-sunk bore 102, and a threaded hole 104 is provided in alignment with the bore 102 in the body 30' of the vertical post 22'. A bolt 106 having an Allen-head socket is slipped into the unthreaded counter-sunk bore 102 and engages the threaded hole 104. When the bolt 106 is tightened, the wedge member 34' moves to the right (FIG. 8) and brings the sloped surface 54 of the wedge 34' into engagement with the sloped surface 76 of the dovetail 62, as described above. In all other respects, the wedge member 34' and vertical post 22' are similar to their counterparts 34, 22 in the embodiment of FIGS. 1–7. The alternative embodiment has the advantage that all manipulations of the wedge member 34' and bolt 106 are performed from the same side of the body 30'.

Figure 9:
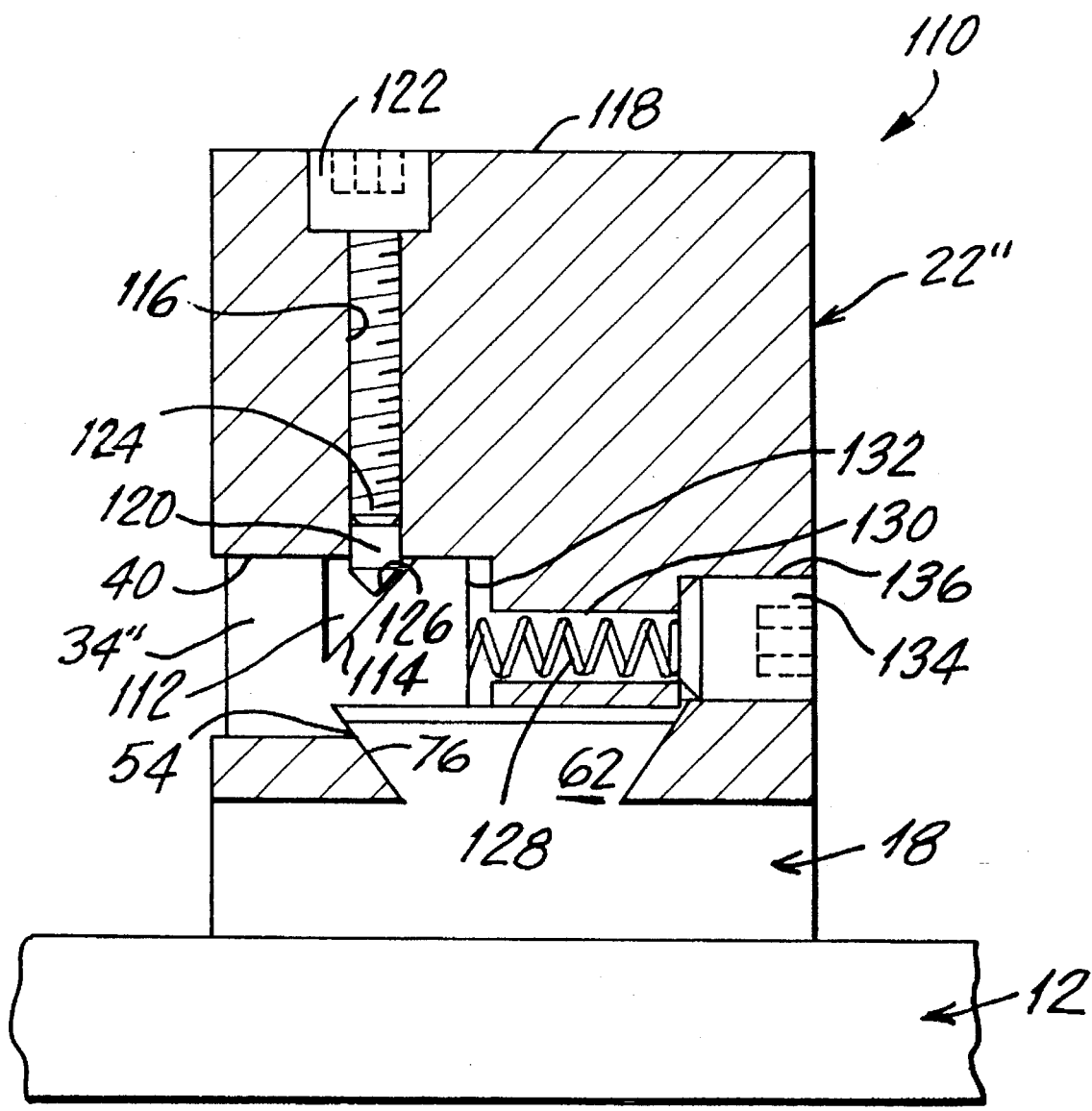
FIG. 9 is another alternative embodiment of a support assembly in accordance with the invention.

Another alternative embodiment 110 of a support assembly in accordance with the invention is illustrated in FIG. 9.

As in the earlier embodiments, the machine table 12 and slide member 18 are the same as described above. A wedge member 34" engages the slide member 18, as described in the previous embodiments. However, no bolt passes through or threadably engages the wedge member 34" which includes a slot 112 having a surface 114 that is at an angle to the cylindrical bore 40 in the vertical post 22". A counter-sunk bore 116, formed in the upper surface 118 of the vertical post 22", intersects the cylindrical bore 40 at a position that exposes the slanted surface 114. A wedge 120 rests on the angled surface 114 and is aligned vertically by the counter-sunk bore 116.

A bolt 122 having an Allen-head socket, threadably engages the bore 116 and presses upon the upper end 124 of the wedge 120. The angle on the leading wedge surface 126 is substantially the same as the angle of the surface 114 on the wedge member 34" such that wedging action is produced when the bolt 122 is rotated. This wedging action moves the wedge member 34" in its bore hole 40 to press the sloped surface 54 of the wedge member 34' against the sloped surface 76 of the dovetail 62, as described above.

A coil spring 128 in an unthreaded bore 130 presses on the interior end 132 of the wedge member 34" and is retained by a threaded machine screw 134 that engages in a threaded counter-sunk hole 136 formed in the side of the vertical post 22".

The spring 128 acts in opposition to the forces generated by the wedge 120. When it is desired to move the vertical post 22" and the bolt 122 is loosened, the spring 128 urges the wedge member 34" out of engagement with the dovetail 62. However, it should be understood that the spring 128 may be omitted without affecting the operability of the device.

Also, it should be understood that the wedge 120 can be formed as an integral conical tip on the bolt 122.

Further, the wedge member 34, illustrated and described as having a generally circular cylindrical body, may have another cross section, for example, square, rectangular, octagonal, etc. and be received in a correspondingly contoured opening in the vertical post 22.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What is claimed:

1. A tool holder support assembly, comprising:

a first support member having a dovetail projection protruding from a first support surface and extending lengthwise in a first direction, said dovetail projection including a pair of opposed sloped surfaces extended in said first direction and converging toward said first support surface to define, in part, a cross section of said dovetail projection;

a second support member having a second support surface with a dovetail slot formed in said second support surface, said dovetail projection of said first support member being slidably engageable in said dovetail slot with said second support surface adjacent to said first support surface, a lateral opening in said second support member extending transversely to and intersecting said dovetail slot to expose a portion of one of said sloped surfaces of said dovetail projection when said first and second support members are slidably engaged;

a wedge member inserted in said lateral opening and having a wedge surface movable translationally without rotation to make contact with said one exposed sloped surface of said dovetail projection, pressing said wedge surface against said one exposed sloped surface causing, by wedge action, said first support surface to press against said second support surface, whereby said first and second support members are releasibly fixed relative to each other; and driving means for translating said wedge surface without rotation to press against said one exposed sloped surface of said dovetail projection.

2. A support assembly as in claim 1, wherein said first and second support surfaces and said sloped surfaces are planar, and said lateral opening is generally cylindrical.

3. A support assembly as in claim 1, wherein said driving means for pressing includes a bolt extending in said transverse direction through a clearance hole in said wedge member and engaging a threaded hole in said second member, rotating said bolt in one direction pressing said wedge surface against said one sloped surface.

4. A support assembly as in claim 1, wherein said driving means includes a second wedge surface on said wedge means, and further comprising:

a wedge acting on said second wedge surface, a screw threadably engaged with said second support member, the leading end of said screw contacting said wedge, turning said screw in one direction pressing said wedge against said second wedge surface to cause said first wedge surface of said wedge means to press against said one sloped surface of said dovetail projection of said first support member.

5. A tool holder support assembly, comprising:

a first support member having a dovetail projection protruding from a first support surface and extending lengthwise in a first direction, said dovetail projection including a pair of opposed sloped surfaces extended in said first direction and converging toward said first support surface to define, in part, a cross section of said dovetail projection;

a second support member having a second support surface with a dovetail slot formed in said second support surface, said dovetail projection of said first support member being slidably engageable in said dovetail slot with said second support surface adjacent to said first support surface, a lateral opening in said second support member extending transversely to and intersecting said dovetail slot to expose a portion of one of said sloped surfaces of said dovetail projection when said first and second support members are slidably engaged;

a wedge member inserted in said lateral opening and having a wedge surface in contact with said one exposed sloped surface of said dovetail projection, pressing said wedge surface against said one exposed sloped surface causing, by wedge action, said first support surface to press against said second support surface, whereby said first and second support members are releasibly fixed relative to each other; and driving means for releasibly pressing said wedge surface against said one exposed sloped surface of said dovetail projections;

a third support member having a T-slot formed in a third support surface thereof, said T-slot being at a right angle to said dovetail projection, said first support member being in sliding contact with said third support surface with said dovetail projection protruding in a second direction away from said third member, and interconnecting means having opposite ends for releasably joining said first and third support members together by pressing said first support member against said third support surface of said third support member, one said end engaging said first support member and the other said end engaging said T-slot.

6. A support assembly as in claim 5, wherein said third member is a horizontal machining table, said first member is a horizontal sliding member, and said second member is a vertical post for supporting a tool holder.

7. A tool holder support assembly, comprising:

a first support member having a dovetail projection protruding from a first support surface and extending lengthwise in a first direction, said dovetail projection including a pair of opposed sloped surfaces extended in said first direction and converging toward said first support surface to define, in part, a cross section of said dovetail projection;

a second support member having a second support surface with a dovetail slot formed in said second support surface, said dovetail projection of said first support member being slidably engageable in said dovetail slot with said second support surface adjacent to said first support surface, a lateral opening in said second support member extending transversely to and intersecting said dovetail slot to expose a portion of one of said sloped surfaces of said dovetail projection when said first and second support members are slidably engaged;

a wedge member inserted in said lateral opening and having a wedge surface in contact with said one exposed sloped surface of said dovetail projection, pressing said wedge surface against said one exposed sloped surface causing, by wedge action, said first support surface to press against said second support surface, whereby said first and second support members are releasably fixed relative to each other; and driving means for releasably pressing said wedge surface against said one exposed sloped surface of said dovetail projection;

wherein said driving means for pressing includes a first threaded bolt engaging a threaded opening in said wedge member, said first bolt extending transversely to said dovetail slot through a clearance hole in said second member to threadably engage said wedge member, rotating said bolt in one direction causing said bolt to threadably penetrate said wedge member and press said wedge surface against said one sloped surface.

8. A device for connecting to a dovetail protrusion extending from an object, comprising:

a body member having an elongated dovetail slot in a first surface thereof for mating with said dovetail protrusion, said dovetail slot extending in a first direction, and including a pair of opposed sloped surfaces extending in said first direction and diverging away from a second surface to define, in part, a cross section of said dovetail slot, an opening in said body member extending in a second direction transverse to and intersecting with one of said sloped surfaces of said dovetail slot, whereby said slot and said opening are joined;

a wedge member inserted in said opening and having a wedge surface substantially parallel with said one intersected sloped surface of said dovetail slot, said wedge member being movable translationally without rotation in said opening in said transverse direction to extend said wedge surface beyond said opening and into said slot, driving means for translationally moving and extending said wedge surface without rotation into said slot, whereby said wedge surface may press against said dovetail protrusion located within said dovetail slot and fix said body member relative to said dovetail protrusion.

9. A tool holder support assembly, comprising:

a first support member having a dovetail projection protruding from a first support surface and extending in a lengthwise direction, said dovetail projection including a pair of opposed first sloped surfaces extended in said lengthwise direction and converging toward said first support surface to define, in part, a cross section of said dovetail projection;

a second support member having a second support surface with a dovetail slot formed in said second support surface, said slot having a pair of second sloped surfaces, said dovetail projection of said first support member being slidably engageable in said dovetail slot with said second support surface adjacent to said first support surface, a lateral opening in one of said first and said second support members extending transversely to said lengthwise direction to expose a portion of one of said sloped surfaces of the other of said support members when said first and second support members are slidably engaged;

a wedge member inserted in said lateral opening and having a wedge surface movable translationally without rotation to make contact with said one exposed sloped surface of said other member, pressing said wedge surface against said one exposed sloped surface of said other member causing, by wedge action, said first support surface to press against said second support surface, whereby said first and second support members are releasably fixed relative to each other; and driving means for translating said wedge surface without rotation to press against said one exposed sloped surface of said other support member.

* * * * *